(12) United States Patent
Coleman et al.

(10) Patent No.: US 7,207,533 B1
(45) Date of Patent: Apr. 24, 2007

(54) TRIPOD STABILIZER

(76) Inventors: David Harold Coleman, 5608 Zoram Ct., Sacramento, CA (US) 95841; Risto Aadolf Rinne, Jr., 8680 Bodega Hwy., Sebastopol, CA (US) 95472

( * ) Notice: Subject to any disclaimer, the term of this patent is extended or adjusted under 35 U.S.C. 154(b) by 88 days.

(21) Appl. No.: 10/449,161

(22) Filed: May 30, 2003

(51) Int. Cl.
*F16M 11/24* (2006.01)

(52) U.S. Cl. ............................. 248/188.2; 248/188.91

(58) Field of Classification Search .......... 248/188.91, 248/188, 188.1, 440, 163.2, 431, 432, 165, 248/166, 188.2, 188.4, 157; 403/132, 126, 403/92, 170
See application file for complete search history.

(56) References Cited

U.S. PATENT DOCUMENTS 2,166,258 A * 7/1939 Matrat ...................... 248/187.1
4,671,479 A * 6/1987 Johnson et al. ............. 248/173
4,767,090 A * 8/1988 Hartman et al. ............ 248/168
6,651,944 B2 * 11/2003 Coleman ................. 248/163.1

* cited by examiner

*Primary Examiner*—A. Joseph Wujciak, III
(74) *Attorney, Agent, or Firm*—Risto A. Rinne, Jr.

(57) ABSTRACT

An apparatus for stabilizing the legs of a tripod includes a center member that is placed inside and proximate the legs preferably about mid-length. The center member includes three perimeter assemblies that each cooperate with a corresponding leg member. The center member is secured to each leg by the leg member which is either attached to each leg or which passes around each leg and is then secured to each perimeter assembly. When each perimeter assembly is tightened, the center member is urged upwards where it pushes all of the legs outward while each leg member prevents one of the legs from moving outward. Accordingly, each leg is placed in a tension that increases its stability and hence the stability of the tripod.

21 Claims, 3 Drawing Sheets

TRIPOD STABILIZER

RELATED APPLICATION

This application is related to U.S. Pat. No. 6,651,944 to Coleman entitled "Tripod Stabilizer and Lighted Lens Carousel" by one of the same inventors.

BACKGROUND OF THE INVENTION

1. Field of the Invention

The present invention, in general relates to tripods and, more particularly, to devices that steady a tripod.

As is well known, tripods are used for a variety of purposes. For example, tripods are used to support cameras (both still and motion), telescopes, surveying apparatus, binoculars, transits, and all manner of equipment.

The basic reason a tripod is used is to provide a steadier hold of the equipment placed thereon than could otherwise occur. Hence, the steadier the tripod itself is, the more utilitarian is its functioning. Accordingly, it is desirable to render a tripod as steady as possible during use.

Prior stabilizing devices have certain limitations. For example, they rely upon a restraint that typically prevents the legs from extending outward beyond a certain point. Such a restrain is typically placed intermediate the ends of the legs. Then, the legs are either allowed to extend on their own or are forced to extend by some mechanism that is placed at or near to the top of the legs.

While this may help steady the tripod, it also tends to bow (i.e., bend in an arc) the legs outward intermediate the top and the restraint. When the legs are forced to bow by the stabilizing structures of the tripod, they are still apt to move a substantial amount in a direction that tends to either increase the amount of bow that is present or in an opposite direction that tends to decrease the amount of bow in the legs. Such movement detracts from stability.

Ideally, a mechanism that tends to force the legs outward and which also simultaneously prevents them from moving outward without introducing any bow along the longitudinal length of the legs would serve to eliminate substantially all of the slack (i.e., tolerance or play) in the legs. The elimination of slack prevents movement of the legs and this, then, produces the desired increase in stability.

Another problem is that there are many tripods currently being built that do not incorporate any stabilizing device. Accordingly, these types of tripod would especially benefit from tripod stabilizer that includes a retrofit capability.

However, tripods and their legs come in a variety of sizes and cross-sectional configurations, with a circle and a square or rectangular cross-section being the most common. These dimensions also vary among the different manufacturers and intended purpose. For example, the diameter of a circular tripod leg can vary from under one-half of an inch to several inches. Similarly, the width and length of rectangular (or square) tripod legs can vary substantially.

These variations tend to make the use of a retrofit device impractical. Also, there is no known way of adding a retrofit device that provides optimum stability.

Another problem is that the prior types of stabilizing devices tend to make the tripod especially bulky and cumbersome to transport when it is collapsed for portage. To obtain any reasonable degree of stabilization, these prior art types of devices must be designed as an integral component for use with the tripod and therefore they are part of the tripod assembly when it is collapsed for portage. This tends to increase bulk.

Also, prior devices tend to take a long time to set up and disassemble.

In addition, the related application mentioned hereinabove discloses a lighted carousel useful during certain applications, for example when a tripod is used to support a telescope. Accordingly, a tripod stabilizer that can be adapted to receive a lighted lens carousel is also desirable.

Also, certain prior art stabilizing devices tend to damage the legs by scratching, marring, indenting, creasing, or otherwise impacting them.

As further support of the invention and also to show possible modifications for the tripod stabilizer, pending patent application Ser. No. 09/812,210 filed Mar. 16, 2001 entitled "Tripod Stabilizer and Lighted Lens Carousel" having the same inventorship, the specification of which is incorporated herein by reference.

Accordingly, there exists today a need for a tripod stabilizer that is adapted to ameliorate the aforementioned problems. In particular, there is need for a tripod stabilizer that does not tend to bow the legs and which is adaptable for use on a variety of different leg cross-sections and diameters, and which can be secured to the tripod with or without any physical connection to the legs.

Clearly, such an apparatus would be a useful and desirable device.

2. Description of Prior Art

Tripods are, in general, known. While the structural arrangements of the known types of devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a tripod stabilizer that is adapted for use with new construction tripods.

It is also an important object of the invention to provide a tripod stabilizer that is adapted for use with existing types of tripods.

Another object of the invention is to provide a tripod stabilizer that is adapted for use with tripods having round or oval shaped legs.

Still another object of the invention is to provide a tripod stabilizer that is adapted for use with tripods having square or rectangular shaped legs.

Still yet another object of the invention is to provide a tripod stabilizer that is adapted for use with different sizes of legs.

Yet another important object of the invention is to provide a tripod stabilizer that is adapted to urge at least one leg in an outward direction and also to simultaneously limit the movement of the leg in the outward direction.

Still yet another important object of the invention is to provide a tripod stabilizer that is adapted to urge all three legs in an outward direction and also to simultaneously limit the movement of the legs in the outward direction.

A first continuing important object of the invention is to provide a tripod stabilizer that includes a portion that urges the legs outward and another portion that prevents the legs from moving outward.

A second continuing important object of the invention is to provide a tripod stabilizer that includes a portion that urges the legs outward and another portion that prevents the legs from moving outward and wherein both portions are preferably disposed within three inches of each other.

A third continuing important object of the invention is to provide a tripod stabilizer that includes a portion that urges the legs outward and another portion that prevents the legs from moving outward and wherein both portions are ideally disposed within one inch of each other.

A fourth continuing important object of the invention is to provide a tripod stabilizer that is adapted for use with legs that include a member attached thereto that is adapted to cooperate with the stabilizer.

A fifth continuing important object of the invention is to provide a tripod stabilizer that is adapted for use with legs that do not include any members attached thereto that are adapted for use with the stabilizer.

A sixth continuing important object of the invention is to provide a tripod stabilizer that is adapted for contact with the legs when an improvement in stability is desired and which can be removed from the legs when the improvement in stability is not desired.

A seventh continuing important object of the invention is to provide a tripod stabilizer that does not damage the legs.

An eight continuing important object of the invention is to provide a tripod stabilizer that includes a leg member that is adapted to surround a portion of a leg of a tripod and which is adapted to cooperate with the tripod stabilizer.

A ninth continuing important object of the invention is to provide a tripod stabilizer that includes a leg member that is attached to a leg of a tripod and which is adapted to cooperate with the tripod stabilizer.

A tenth continuing important object of the invention is to provide a tripod stabilizer that includes a leg member that is included as an integral part of a leg of a tripod and which is adapted to cooperate with the tripod stabilizer.

An eleventh continuing important object of the invention is to provide a tripod stabilizer that simultaneously applies a force extending a leg and a force compressing the leg of a tripod.

A twelfth continuing important object of the invention is to provide a tripod stabilizer that simultaneously applies a first force urging a first side of a leg of the tripod outward and a second force on a second opposite side of the leg urging the leg inward thereby securing the leg in compression and wherein both forces are provided by the same device.

A thirteenth continuing important object of the invention is to provide a tripod stabilizer that simultaneously applies a first force on a first plane urging a first side of a leg of the tripod outward and a second force on a second plane applied to a second opposite side of the leg urging the leg inward and wherein the distance from the first plane to the second plane is not more than six inches.

A fourteenth continuing important object of the invention is to provide a tripod stabilizer that simultaneously applies a first force on a first plane urging a first side of a leg of the tripod outward and a second force on a second plane applied to a second opposite side of the leg urging the leg inward and wherein the distance from the first plane to the second plane is preferably not more than three inches.

A fifteenth continuing important object of the invention is to provide a tripod stabilizer that simultaneously applies a first force on a first plane urging a first side of a leg of the tripod outward and a second force on a second plane applied to a second opposite side of the leg urging the leg inward and wherein the distance from the first plane to the second plane is ideally not more than one inch.

A sixteenth continuing important object of the invention is to provide a tripod stabilizer that simultaneously applies a first force urging a first side of a leg of the tripod outward and a second force applied to a second opposite side of the leg urging the leg inward and wherein the first force and the second force are on the same plane.

Briefly, a tripod stabilizer that is constructed in accordance with the principles of the present invention has a center member that is placed along the longitudinal length of the legs of the tripod. The center member includes three perimeter assemblies each of which are adapted to cooperate with one of the three leg members. Each of the leg members surrounds a portion of each leg respectively and then cooperates with perimeter assembly so that when tightened, the center member is urged upward and into contact with an inside surface of the legs which are then urged outward. The legs are simultaneously prevented from being displaced outward beyond a predetermined distance by the leg members. This puts each leg under both an extensive force on one side (i.e., the inside of the leg) and a compressive force on the opposite side of the leg, thereby capturing each leg in a compressive stress that tends to eliminate virtually all of the slack in the legs proximate the stabilizer. The force that urges the legs outward is disposed on a first plane and the force that urges the legs inward is disposed on a second plane wherein the distance from the first plane to the second plane is not more than six inches and is preferably not more than three inches and is ideally not more than one inch to prevent any bowing of the leg. Preferably, the center member is disposed midway along the length of the legs during use for optimum stability. The leg members include a size and shape that corresponds with that of the legs thereby lessening the possibility of damaging the legs.

DETAILED DESCRIPTION OF THE INVENTION

Figure 1:
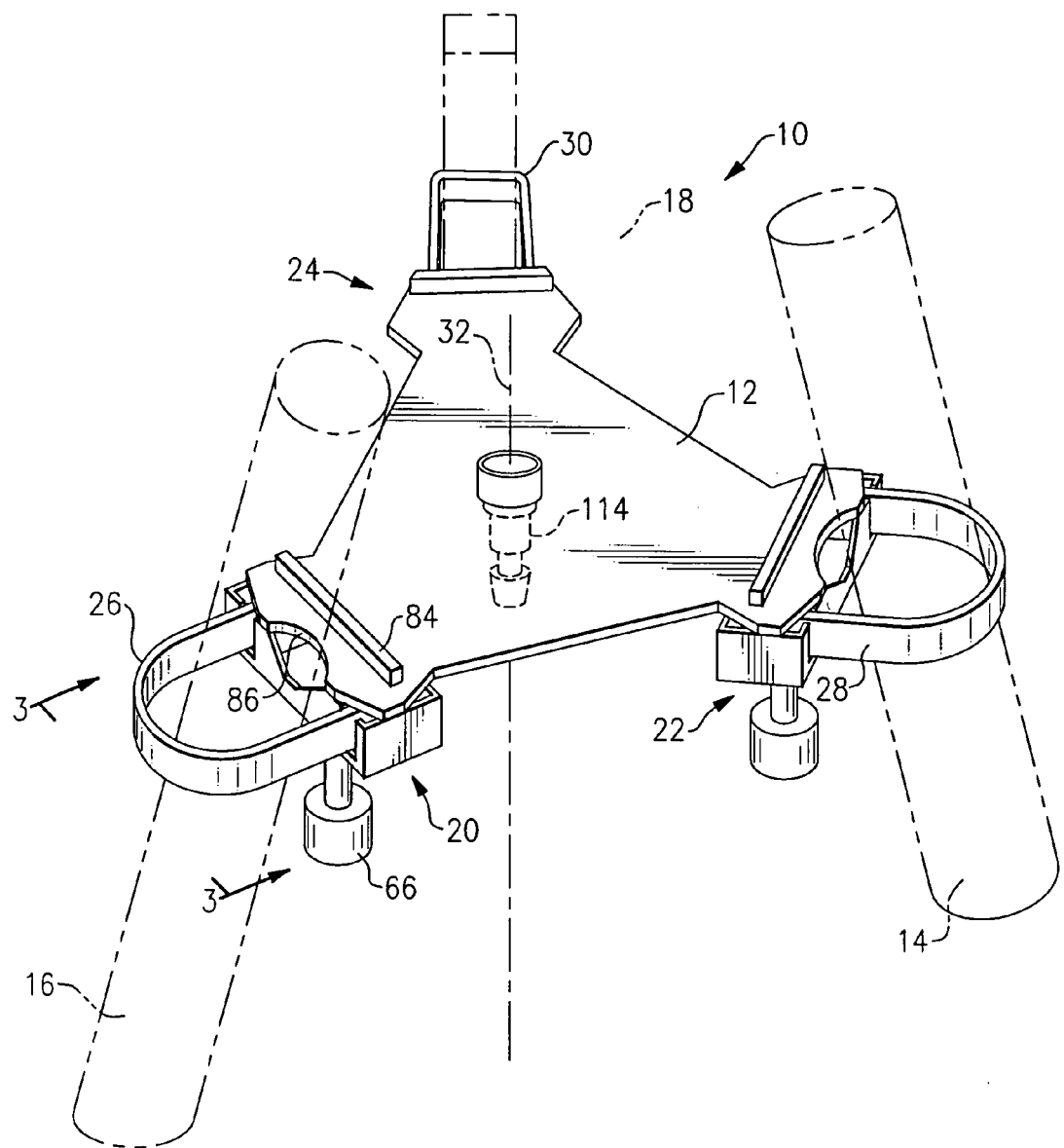
FIG. 1 is a view in perspective of a tripod stabilizer.

Referring to all of the drawings and in particular to FIG. 1 is shown, a tripod stabilizer, identified in general by the reference numeral 10.

The tripod stabilizer 10 includes center member 12 that is substantially a rigid planar component that is placed intermediate three legs 14, 16, 18, of a tripod, the legs 14, 16, 18 being shown in dashed lines. Obviously, the shape of the center member 12 is a variable. For example, a less planar and thicker, more three dimensional structure could be utilized, if desired. What is important is that the center member 12 provide the rigidity required to stabilize the tripod, as is described in greater detail hereinafter.

The center member 12 is disposed intermediate the ends of each leg 14, 16, 18 of the tripod. It does not matter what the size or shape (i.e., cross-section) of any of the legs 14, 16, 18 may be. For example, as shown, the first leg 14 is oval. The second leg 16 is round and includes a diameter that is different than the first leg 14. The third leg 18 is rectangular.

Typically, all of the legs 14, 16, 18 of the tripod have the same size and shape, however they may vary as shown if desired. The intention behind showing three different legs 14, 16, 18 is to show how the tripod stabilizer 10 is adapted to cooperate with all known sizes and shapes of tripods regardless of the attributes of the legs 14, 16, 18.

The tripod stabilizer includes three perimeter assemblies 20, 22, 24. See FIG. 3 for a detail of one of them.

A first leg member 26 is adapted to cooperate with the first perimeter assembly 20. A second leg member 28 is adapted to cooperate with the second perimeter assembly 22. A third leg member 30 is adapted to cooperate with the third perimeter assembly 24.

Each leg member 26–30 is adapted to surround at least a portion of each leg 16, 14, 18 respectively, during use. Each leg member 26–30 passes around a portion of the outside of each leg 16, 14, 18 (i.e., that portion of each leg that is disposed away from a center longitudinal axis 32).

Figure 4:
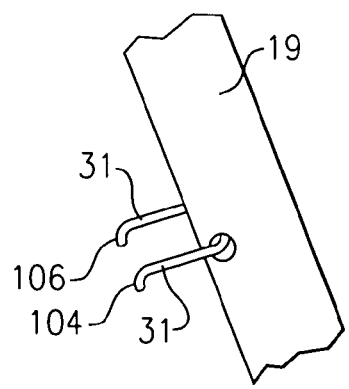
FIG. 4 is a view of a modified leg of a tripod with a leg member attached to the modified leg.

According to a modification, a portion of a modified tripod leg 19 (FIG. 4) may be provided instead of the leg members 26–30 where a pair of modified extension portions 31 of the leg member 26–30 are attached to or incorporated as an integral part of the modified tripod leg 19.

The center longitudinal axis 32 is the center of the tripod when it is open and adapted for use and generally points in a direction that is toward the center of earth and away therefrom. Any item or object that the tripod is supporting is not shown nor are substantial portions of the tripod that are disposed above or below the tripod stabilizer 10, as they are not needed for an understanding of the invention.

It is important to note that the tripod stabilizer 10 can be attached where desired to the legs 14, 16, 18. The size of the center member 12 affects the positioning to some extent in that if the tripod's legs 14–18 are open a typical amount, then a smaller center member 12 will cause the tripod stabilizer 10 to be raised more away from the center of the earth than would a larger center member 12.

Preferably, the tripod stabilizer 10 is sized so that it is not closer than one-third of the overall length of the legs 14–18 to either the top or bottom of the legs 14–18.

The ideal location is to place the tripod stabilizer 10 at the center or midway point along the longitudinal length of the legs 14–18. For unique applications, it is possible to use more than one tripod stabilizer 10.

For example if greater stability is required, two tripod stabilizers 10 could be used with each one located a predetermined distance away from the other in a spaced-apart parallel relationship to each other. Accordingly, one stabilizer 10 is disposed one-third of the way from top to bottom of the legs 14–18 and the other is two-thirds of the way from top to bottom. Three stabilizers 10 could be used dividing the length of the legs 14–18 into quarters and so on, as desired.

Each leg member 26–30 can be attached to or detached away from its respective perimeter assembly 20–24 as desired. Typically, all of the leg members 26–30 and all of the perimeter assemblies 20–24 are identical. When they are identical, any leg member 26–30 can be used with any perimeter assembly 20–24. This hastens assembly and use of the tripod stabilizer 10 as well as disassembly thereof.

In normal use, the tripod is positioned for use by opening the legs 14–18 and placing them in an open position, as desired, on a ground surface. Their length may be adjusted, as is common, to better level the tripod. The legs 14–18 tend to merge together, or nearly together, proximate a top of the tripod where they typically are secured and allowed to pivot in or out about a pivot axis (not shown) as is common in tripod design. The legs 14–18 are maximally disposed away from the center longitudinal axis 32 at a bottom of each leg 14–18 where contact with the ground is made.

The center member 12 is then placed intermediate the legs 14–18 and is raised along the center longitudinal axis 32 until the perimeter assemblies 20–24 are disposed proximate each leg 14–18 and the center member 12 is substantially level with respect to a plane of the ground.

At that time, one of the leg members 26 is placed over the outside of the leg 16 and is urged into the first perimeter assembly 20 until it is captured therein. Engagement of the leg members 26–30 with the perimeter assemblies 20–24 is described in greater detail hereinafter.

Each perimeter assembly 20–24 is then tightened which secures the stabilizer 10 in position and further stabilizes the legs 14–18.

Figure 3:
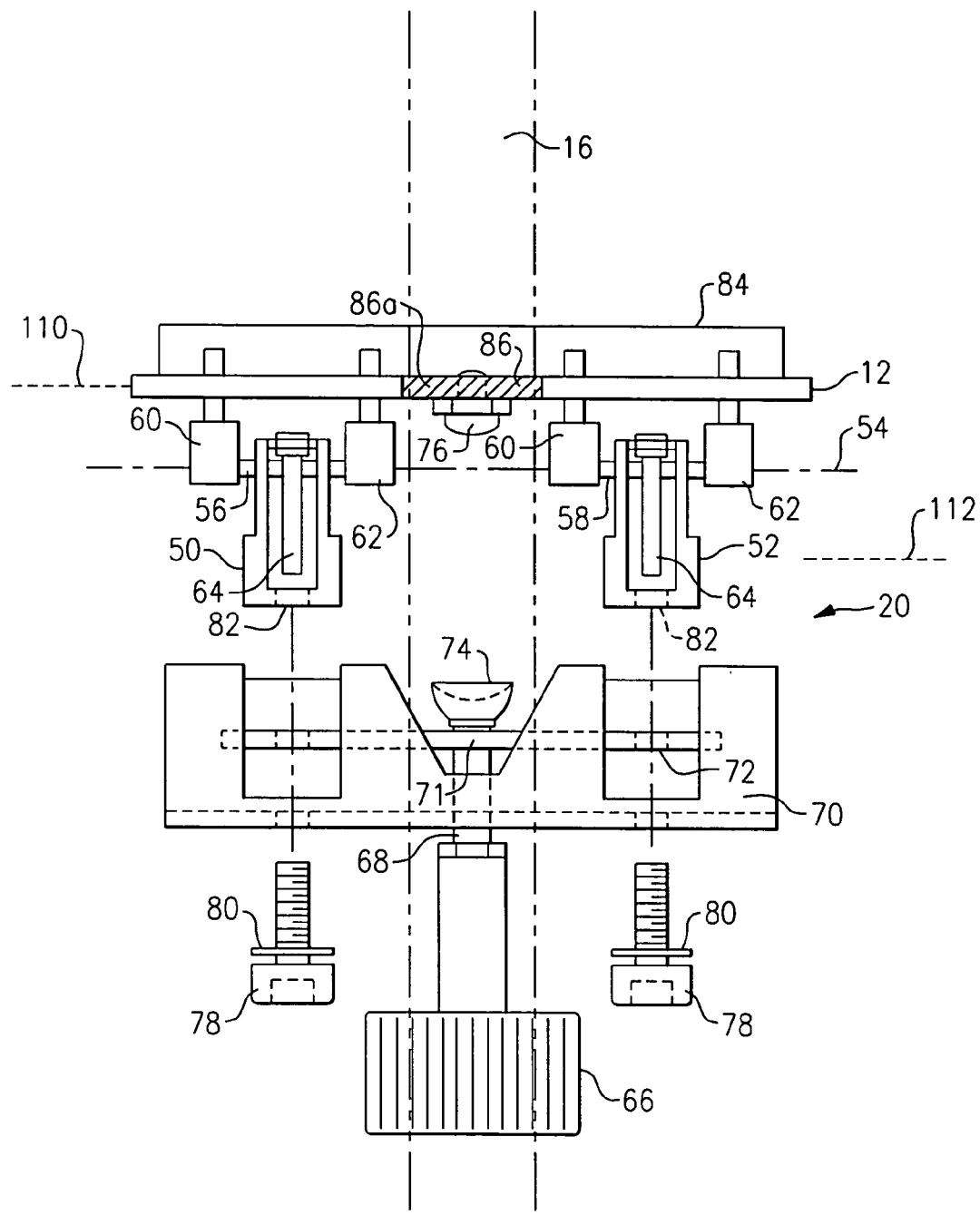
FIG. 3 is an exploded view of the tripod stabilizer of FIG. 1 taken along the line 3—3.

Referring now also to FIG. 3, for a more detailed description of how the leg members 26–30 are secured to the perimeter assemblies 20–24 and how the stabilizer 10 functions. It is important to note that many design modifications will become apparent after having had benefit of this disclosure and that, while a preferred mode is described herein, it is understood that many other design modifications are possible.

A pair of receiving members 50, 52 have a generally "U-shape" with closed sides and an open front and back is provided. The receiving members 50, 52 are adapted to pivot about a suspension axis 54, shown in dashed lines. A pair of pivot rods 56, 58 pass through holes in the top of the receiving members 50, 52. The pivot rods 56, 58 are each secured at opposite ends thereof to a pair of suspension bolts 60, 62 that are, in turn, threaded into the center member 12 that is disposed immediately above them.

Accordingly, the receiving members 50, 52 are disposed below the center member 12 and are adapted to pivot about the suspension axis 54, or stated in another way, the bottom of each receiving member 50, 52 is able to pivot into or out of the FIG. 3 drawing sheet as shown.

A spring 64 is attached to the top of each receiving member 50, 52, alternately to each pivot rod 56, 58 at a first end and extends down to toward an inside bottom of each receiving member 50, 52 at a rear (i.e., the side closest toward the center longitudinal axis 32) thereof. A second end of each spring 64 is disposed proximate the inside top rear of each receiving member 50, 52.

A threaded member 66 includes a lower knob and a threaded shaft 68 that extends up through a hole in a bottom of a perimeter assembly lower cover 70 and through a threaded center hole 71 in a mounting plate 72. The threaded shaft 68 engages the threads of the center hole 71. A concave shaped arcuate top 74 is adapted to engage with a convex shaped spherical bolt 76 that is attached to the center member 12 when the threaded member 66 is tightened.

A pair of bolts 78, each with a washer 80, pass through holes in the lower cover 70 and each engage with a threaded hole 82 located in the bottom of each receiving member 50, 52. The length of the bolts 78 is chosen so that they do not extend excessively into the space inside of each of the receiving members 50, 52 when they are tightened. When the bolts 78 are tightened, the lower cover 70 is adjacent the mounting plate 72 which is, in turn, adjacent to the bottom of each of the receiving members 50, 52.

A top cover 84 is used on top of the center member 12 over each perimeter assembly 20–24 so as to dress up the appearance of the top thereof.

Because the tripod leg 16 is round for this particular application and having a particular diameter, an arcuate recess 86 is provided in the center member 12 intermediate each of the receiving members 50, 52. The arcuate recess 86 includes a diameter and shape that corresponds with that of the leg 16. This helps prevent marring of the leg 16.

In addition, the arcuate recess 86 preferably includes a taper, wherein the top is disposed closer to the center longitudinal axis 32 than is a bottom thereof. This ensures that when the arcuate recess 86 makes contact with the leg 16, that contact will occur over as much of the surface area of the arcuate recess 86 as possible thereby lessening further the chances of damaging (i.e., marring) the inside of the leg 16.

Also, a non-marring coating 86a, such as a rubber strip, is placed over the arcuate recess 86 as desired to lessen the chance of damage to the leg 16.

The suspension axis 54 and the spherical bolt 76 are in parallel alignment with each other and are all disposed behind the inside most portion of the arcuate recess 86 (i.e., closer to the center longitudinal axis 32 than the arcuate recess 86).

Figure 2:
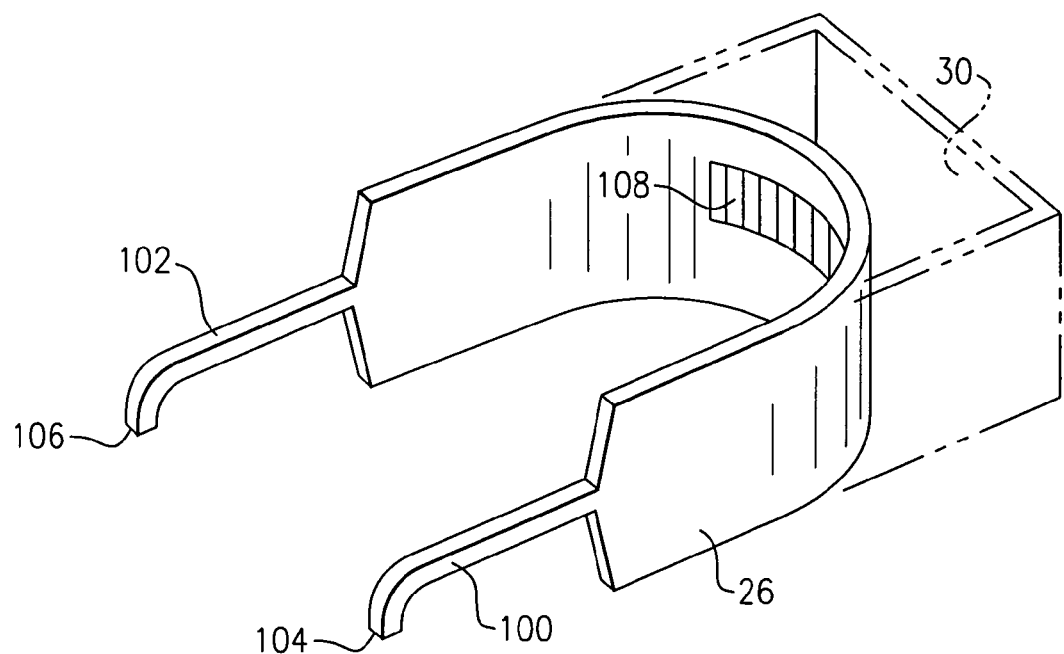
FIG. 2 is a view in perspective of a leg member with a modification also being shown.

Referring now in particular to FIG. 2, the leg member 26 includes a pair of extension members 100, 102 that are attached at a first end thereof to the leg member 26. The leg member 26 includes a substantially U-shaped appearance and is open on the side having the extension members 100, 102. The extension members 100, 102 are in a parallel spaced-apart relationship with respect to each other.

The extension members 100, 102 each include a hooked opposite end 104, 106 where the hook points generally downward.

The end of the leg member 26 that is opposite the extension members 100, 102 includes an inner radius or other curvature that is intended to match that of the outside of the leg 16.

Accordingly, the inner radius of the leg member 26 corresponds with the shape of the outside of the leg 16 and the arcuate recess 86 corresponds with the shape of the inside of the leg 16.

As was stated, the third leg 18 is rectangular instead of round or oval. To accommodate this, the leg member 30 (shown in dashed lines in FIG. 2) is provided with an appropriate polygonal shape that matches the rectangular or square shape of the third leg 18. If the tripod includes all legs that are like the third leg 18, then all of the leg members would be so modified to match as would the arcuate recesses 86 be modified to match the inside contour of the polygonal third leg 18.

A non-marring strip 108 made of rubber, for example, is added to the inside of the leg member 30 to further lessen damage to the leg 16.

Continuing with a more detailed explanation as to the use of the tripod stabilizer 10, the center member 12 is raised along the inside of the tripod on the longitudinal axis and it is rotated until the perimeter assemblies 20–24 align with the legs 14–18.

Then a matching shaped leg member 26 is placed around the leg 16 from the outside of the leg (i.e., that which is disposed furthest away from the center longitudinal axis 32) and is urged toward the corresponding perimeter assembly 20. The leg member 26 is oriented so that the hooked opposite ends 104, 106 point downward. The leg member 26 is urged toward the longitudinal axis 32 at the proper elevation so as to ensure that the extension members 100, 102 each enter into an open end of one of the receiving members 50, 52.

The top of each extension member 100 will begin to bear against the bottom of each spring 64 tending to urge the extension members 100 toward the bottom of each receiving member 50, 52.

When fully inserted, the hooked ends 104, 106 will extend beyond the receiving members 50, 52 and will be urged further downward by the springs 64. Accordingly, the leg member 26 is held in place and cannot be pulled out in the direction it came unless it is first deliberately raised so that the bottom of each hooked end 104, 106 can clear the bottom surface of each receiving member 50, 52.

In actual use, the leg member 26 is urged toward the perimeter assembly 20 where it snaps (i.e., latches) into position. Accordingly, the leg 16 is secured to the center member 12. This process is quickly repeated for the two remaining legs 14, 18 at the two remaining perimeter assemblies 22, 24. If all of the legs are identical in shape any leg member can be used at any of the perimeter assemblies. This process step is quick and easy to perform.

When the leg members 26, 28, 30 are properly sized, the non-marring strips 108 or the interior surfaces of each leg member 26–30 will contact a portion of the outside of each leg 14–20.

At this time, each threaded member 66 is tightened until the inside of the arcuate top 74 bears against the bottom of the spherical bolt 76. The threaded member 66 is tightened further which bears against the spherical bolt 76 pushing the center member 12 up. As the center member 12 moves up, the arcuate recess 86 bears against the inside of the leg 16 which tends to urge the leg 16 outward away from the center longitudinal axis 32.

As the center member 12 moves up, the leg member 26 simultaneously begins to pivot slightly in a downward direction (i.e., the outside of the leg member 26 moves down) causing the leg member 26 to make even tighter contact with the leg 16. As the leg member 26 cannot move away from the perimeter assembly 20 because it is held in place by the hooked ends 104, 106 cooperating with the bottom surface of the receiving members 50, 52, the leg 16 is prevented from moving outward while it is being urged to do so as the threaded member 66 is tightened further.

Resistance increases abruptly which informs a user that the threaded member 66 is sufficiently tight. The leg 16 is held in tension between the equilibrium of a first force tending to urge it away from the center longitudinal axis 32 (as caused by the upward motion of the center member 12) and of a second force opposing the outward motion of the leg 16 (by the resistance provided by the inside surface of the leg member 26).

The threaded member 66 is released and the leg 16 is stabilized so as to prevent motion proximate the stabilizer 10. The tightening process is repeated at the two remaining perimeter assemblies 22, 24 to complete installation of the tripod stabilizer 10 sufficient for steady use of the tripod.

After use, the three threaded members 66 are loosened and each leg member 26, 28, 30 is removed by first lifting it so as to clear the hooked ends 104, 106 from the receiving members 50, 52. The leg members 26–30 are then pulled away from the longitudinal axis 32 while supporting the center member 12 by placing a hand under it to support its weight. The tripod stabilizer 10 is quick and easy to install and to remove and yet it provides an improvement in stability not previously available.

It is important to note that, as described, the stabilizer 10 has no inherent initial mechanical connection with the tripod. The stabilizer 10 can accordingly be used with virtually any type of a pre-existing tripod or future tripod without modification or damage to the tripod.

If desired, the tripod can itself be modified to cooperate with the principles of the tripod stabilizer 10 by making modification to the legs of the tripod. See FIG. 4. In this instance, the modified extension members 31 are attached (i.e., welded or molded) on opposite sides of the modified leg 19 at a preferred elevation along the length of the modified leg 19. The hooked portions 104, 106 are identical and cooperate the same with perimeter assemblies 20–24.

The step of placing the leg members 26, 28, 30 around the legs 14, 16, 18 is eliminated because the modified legs 19 include an integral leg member in the form of the modified extension members 31 that are attached thereto. The modified legs 19 are instead urged into the receiving members 50, 52. The modified extension members 31 can be attached by welding, molding, or after market, such as by a clamping arrangement.

The essential principle of any version of the tripod stabilizer 10 is that it applies a force to the legs 14–18 that tends to urge them away from the center axis 32 while preventing them from doing so, thereby eliminating virtually all slack in the legs 14–18. The legs 14–18 are put under a compressive loading as a result of two forces being applied thereto, a force applied to the inside that is attempting to extend each leg 14–18 and a force applied to the outside that is attempting to retract each leg 14–18. As each side of each leg 14–18 is experiencing a force applied in an opposite direction, the legs 14–18 experience compression on both sides thereof.

Another benefit is that the force that tends to urge the legs 14–18 outward (i.e., the arcuate recess 86 of the center member 12) is at very nearly the same elevation as the force that retains them in (i.e., the inside of the leg members 26–30). Since these forces are applied nearly on opposite sides of each leg 14–18, there is no bending of the legs in an arc (i.e., a bow) that takes place. The legs 14–18 remain straight and optimally rigid.

It is possible to alter the shape of the center member 12 so that it has a greater thickness. Accordingly the force pushing the legs 14–18 outward can be offset with regard to the force tending to retain/retract them inward. This offset should not be more than six inches, else substantial bowing is apt to occur, and preferably should be less than three inches, and ideally, within one inch. A perfect arrangement is when the two forces are disposed on the same plane (i.e., on opposite sides of each leg 14–18) as there is no tendency to bend the legs at all in that instance.

Referring momentarily to FIG. 3, a first elevation 110 is shown in dashed lines at the same plane as that of the center member 12 and is the elevation at which the legs 14–18 are urged outward. A second elevation 112 is shown in dashed lines where the leg member 26 (not shown in this drawing) is disposed on the outside of the leg 16. It is the difference between the first and second elevations 110, 112 that is minimized by the tripod stabilizer 10.

Referring now again to FIG. 1, a center pivot 114, shown in dashed lines, is attached to middle of the center member 12 and it extends downward underneath the center member 12. The center pivot 114 aligns with the center longitudinal axis 32.

The preferred center pivot 114 includes a device that is commonly used as a "quick-connect" fitting that is normally used to connect an air tool (not shown) to an air hose (not shown). For this particular application a very different purpose exists in which no air is used.

The utility of the center pivot 114 is that a carousel (not shown) that is used to support lenses or other accessories as may be required for use with the tripod can be suspended from under the center member 12 by merely urging a corresponding mating member (not shown) that is attached to a top of the carousel over the center pivot 114 until it snaps into place. In this position, the carousel can be suspended under the center member 12 and it can be rotated in an infinite number of circle loops in either direction about the center longitudinal axis 32.

When no longer desired, the carousel is removed by raising a portion of the corresponding mating member and then disconnecting the corresponding mating member from the center pivot 114 by simply lowering it and the carousel away from the center member 12. Different types of carousels (not shown) can be readily applied, used, and removed, as desired. For an explanation of one type of possible carousel that can be modified for such use by the addition of the corresponding mating member thereto, refer to the specification of the incorporated reference.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A tripod stabilizer for improving the stability of a tripod having three legs, comprising:
    (a) a center member;
    (b) three perimeter assemblies attached to an outside of said center member and separated by approximately 120 degrees of arc;
    (c) three leg members that are each adapted to cooperate with one of said perimeter assemblies whereby each of said leg members is adapted to prevent each leg of said tripod from being urged away from a center longitudinal axis of said tripod; and
    (d) means for urging said each leg of said tripod outward and away from said center longitudinal axis, said means for urging attached to said tripod stabilizer and wherein said means for urging is adapted to supply a force to at least a portion of said each leg of a tripod in a direction away from said center longitudinal axis and wherein said means for urging is adapted to supply said force independent of said leg members;
    and wherein said perimeter assembly includes means for retaining said leg member sufficient to prevent said leg member from being displaced away from said center longitudinal axis;
    and wherein said means for urging said leg away from said center longitudinal axis includes means for raising said center member with respect to said center longitudinal axis sufficient to cause a portion of said center member to make contact with a portion of said leg on a side of said leg that is disposed closest toward said center longitudinal axis; and
    wherein said means for raising includes suspending a portion of said perimeter assembly under said center member along a suspension axis and wherein said portion of said perimeter assembly is adapted to pivot about said suspension axis and including a threaded member that is adapted to be displaced generally up and down with respect to said center member and wherein when said threaded member is displaced in an upward direction sufficient to contact said center member, said perimeter assembly is adapted to pivot about said suspension axis as said center member is urged upward along said center longitudinal axis and away from said portion of said perimeter assembly.

2. The tripod stabilizer of claim 1 wherein any of said leg members is adapted to surround a portion of an outside of said each leg.

3. The tripod stabilizer of claim 1 wherein any of said leg members is attached to said each leg.

4. The tripod stabilizer of claim 1 wherein any of said leg members is included as an integral component part of said each leg.

5. The tripod stabilizer of claim 1 whereby an amount of displacement possible for said each leg of said tripod by said means for urging said each leg away is limited by said each leg making contact with a portion of said leg member.

6. The tripod stabilizer of claim 5 wherein a slack of said each leg of said tripod is diminished by said contact with said portion of said leg member.

7. The tripod stabilizer of claim 1 wherein said leg member is adapted to pivot with respect to said center member as said perimeter assembly pivots.

8. The tripod stabilizer of claim 1 wherein said leg member includes at least one extension portion that is adapted to enter into at least one receiving member, and wherein said receiving member is adapted to retain said extension portion therein.

9. The tripod stabilizer of claim 8 wherein said receiving member includes means for urging said extension portion into a position that is adapted to retain said extension portion therein.

10. The tripod stabilizer of claim 9 wherein said means for urging said extension portion includes a spring.

11. The tripod stabilizer of claim 1 wherein said center member includes protective means for decreasing damage to said leg.

12. The tripod stabilizer of claim 1 wherein said leg member includes protective means for decreasing damage to leg member.

13. The tripod stabilizer of claim 1 wherein said leg member includes an arcuate portion that is adapted to make contact with said leg.

14. The tripod stabilizer of claim 1 wherein said leg member includes a polygonal portion that is adapted to make contact with said leg.

15. The tripod stabilizer of claim 14 wherein said polygonal shape includes a rectangle.

16. The tripod stabilizer of claim 14 wherein said polygonal shape includes a square.

17. The tripod stabilizer of claim 1 wherein said means for urging is disposed at a first elevation above a surface of the ground and wherein said leg member is disposed at a second elevation above said surface and wherein said first elevation and said second elevation are not separated by more than six inches.

18. The tripod stabilizer of claim 1 wherein said means for urging is disposed at a first elevation above a surface of the ground and wherein said leg member is disposed at a second elevation above said surface and wherein said first elevation and said second elevation are not separated by more than three inches.

19. The tripod stabilizer of claim 1 wherein said means for urging is disposed at a first elevation above a surface of the ground and wherein said leg member is disposed at a second elevation above said surface and wherein said first elevation and said second elevation are not separated by more than one inch.

20. The tripod stabilizer of claim 1 including means for attaching a carousel to said stabilizer.

21. The tripod stabilizer of claim 20 wherein said means for attaching a carousel includes a first half of a quick connect, quick disconnect type of a coupler attached to said tripod stabilizer and a corresponding second half of said coupler attached to said carousel, and wherein said axis passes through a center of said coupler and wherein said first half of said coupler is attached to said center member.

\* \* \* \* \*